United States Patent [19]

Hines et al.

[11] 4,136,477

[45] Jan. 30, 1979

[54] FISHHOOK DEVICE

[76] Inventors: Paul R. Hines, 3721 Williamsburg, Boise, Id. 83706; Edward A. Shelly, 3010 S. Willis, Abilene, Tex. 79605; Paul R. Hines, 1237 Anson Ave., Abilene, Tex. 79601

[21] Appl. No.: 793,198

[22] Filed: May 2, 1977

[51] Int. Cl.$^2$ .............................................. A01K 97/00

[52] U.S. Cl. ........................................................ 43/15

[58] Field of Search ............................ 43/15, 16, 44.88

[56] References Cited

U.S. PATENT DOCUMENTS

| | | | |
|---|---|---|---|
| 1,816,235 | 7/1931 | Schroeder | 43/15 |
| 2,419,378 | 4/1947 | Thomas et al. | 43/15 |
| 2,523,927 | 9/1950 | Stallings | 43/15 |
| 3,060,615 | 10/1962 | Spets | 43/15 |
| 3,470,646 | 10/1969 | Erkkila | 43/15 |
| 3,702,512 | 11/1972 | Hodshire | 43/15 |
| 3,874,106 | 4/1975 | Edwards | 43/15 |

*Primary Examiner*—Edward M. Coven

*Attorney, Agent, or Firm*—Clarence A. O'Brien; Harvey B. Jacobson

[57] ABSTRACT

A device for "setting" a hook in the mouth of a fish when the fish pulls at the bait on the hook, the invention is attached to spaced ends of a fishing line between the user and the hook. The present device comprises a shaft member which carries a tension spring along its length and which has a trip arm pivotally attached to its lower end. The tension spring releasably engages the trip arm along its length and holds the trip arm under tension at right angles to the shaft member. A relatively short length of fishing line is tied to a lower portion of the tension spring and is threaded through the trip arm. A relatively long length of fishing line is tied to the upper end of the shaft member and extends to a fishing pole or rod or a trotline. A fish pulling on a baited hook tied to the free end of the relatively short length of fishing line causes the trip arm to be pulled into alignment with the shaft member, thereby releasing the tensioned spring from engagement with the trip arm. The spring contracts to snap the hook toward the upper end of the shaft member, thereby setting the hook in the mouth of the fish.

6 Claims, 6 Drawing Figures

FISHHOOK DEVICE

BACKGROUND AND SUMMARY OF THE INVENTION

Man discovered the art of fishing with a baited hook tied to the end of a length of line countless centuries ago. Although the fishing arts have progressed rapidly in many directions, including improvements made to the hand-held apparatus used by a fisherman to deploy and retrieve the baited hook, that portion of the fishing apparatus which actually lies beneath the surface of the water, that is, the barbed hook and a portion of the fishing line, have largely been improved only by changes in the materials used for their fabrication. In particular, the "art" of setting a hook in the mouth of a fish when the fish "bites" the baited hook has remained primarily a matter of skill which must be acquired and practiced. Even though a number of devices have been suggested in recent years which had as their purpose improvement in the setting of a hook in the mouth of a fish, the prior art has not provided a simple, economical, and reliable device for this purpose. Various spring devices are provided by the prior art which disclose the use of a spring which is tensionably held until released when a fish strikes a baited hook, the hook being then set in the mouth of the fish by the rapid energetic compression of the spring. However, none of the prior devices disclose the present device wherein a pivot arm is provided with a plurality of notches, a selected one of the notches receiving an end of a tensioned spring such that the pivot arm is pivoted downwardly when a fish strikes the baited hook. The spring is thus disengaged from the notch in the pivot arm and released, thereby allowing contraction of the spring to its untensioned conformation. The hook, which is attached to the spring by means of a short length of line, is thereby set in the mouth of the fish. The present device has spaced apertures provided in a central body member thereof so that a user of the device can adjust the tensioning of the spring to provide a desired level of force when the spring retracts. Further, a plurality of notches are provided in the pivot arm, the user thereby being able to vary the level of force necessary to trip the spring and thus set the hook. In this manner, a conscious choice can be made by the fisherman relative to the size of the fish which he wishes to be capable of triggering the setting of the hook.

Accordingly, it is an object of the invention to provide an apparatus useful with a fishing line and hook for setting the hook in the mouth of a fish when the hook is struck by a fish.

It is another object of the invention to provide a fishhook setting apparatus which can be adjusted by a user to determine the force which will be applied to set the hook in the mouth of a fish when the fish strikes the hook.

It is a further object of the invention to provide a fishhook setting apparatus which can be adjusted by a user to determine the size and strength of a fish necessary to cause operation of the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
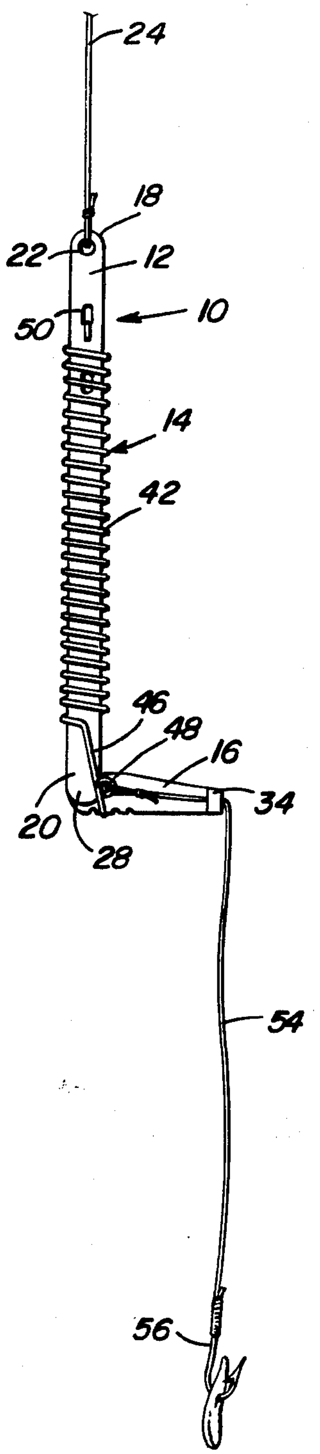
FIG. 1 is an elevational view of the invention in an operational environment prior to actuation of the device.
Figure 3:
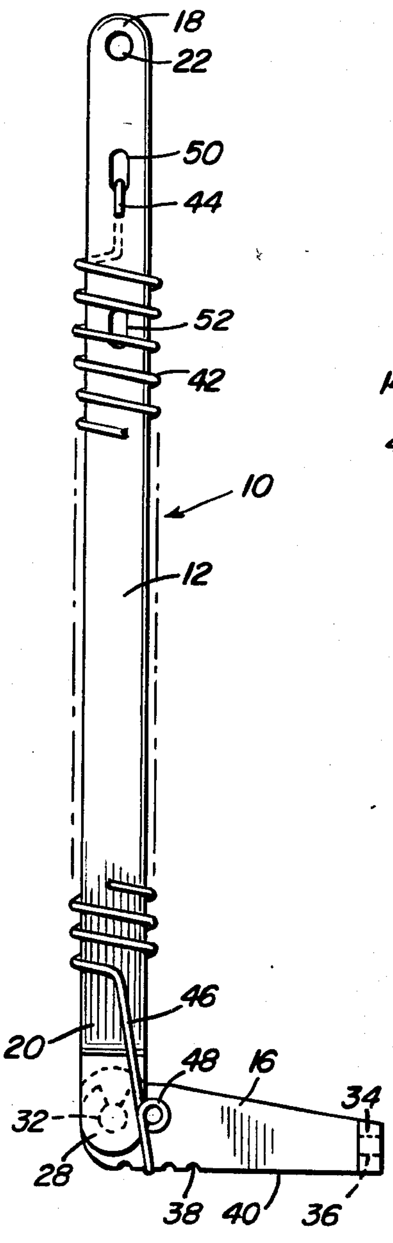
FIG. 3 is a detailed elevational view of the device.
Figure 4:
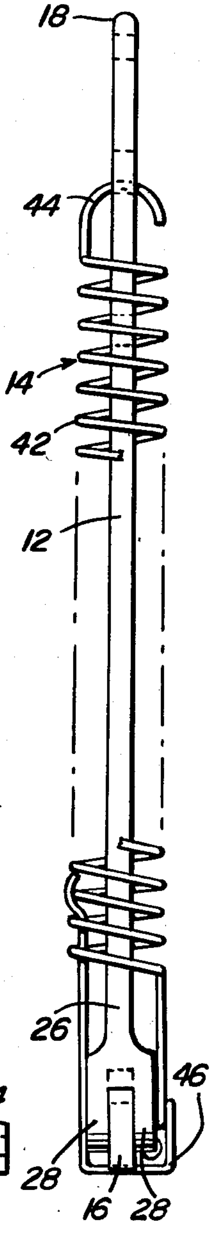
FIG. 4 is a detailed end view of the device.

Referring now to the drawings and particularly to FIGS. 1 and 3, the present hook setting device 10 is seen to be comprised of a major body member 12, a tension spring 14, and a pivot arm 16. The major body member 12 can be preferably formed of a rod-like piece of flat plastic stock, the member 12 being rounded at its respective upper and lower ends 18 and 20 for convenience. The member 12 has an aperture 22 formed in the upper end 18 to receive the distal end of a fishing line 24, the line 24 being tied or otherwise connected to the member 12 through use of the aperture 22. The lower end 20 of the member 12, as can be also seen in FIG. 4, is formed into a yoke 26, the arms 28 being spaced apart to receive the inner end of the pivot arm 16 therebetween. A pin 30 extends laterally between the arms 28 and is received through an open-sided aperture 32 in the inner end of the pivot arm 16, the pivot arm 16 thus being capable of press-fitting onto the pin 30 for pivoting movement about said pin, as can also be seen in FIG. 5. The pivot arm 16 further has an enlarged distal end member 34 having an aperture 36 formed therein, which member 34 can be best seen in FIG. 6. The pivot arm 16 also is rounded about its inner end to facilitate pivotal movement within the yoke 26. The pivot arm 16 further has a series of spaced notches 38 formed along a lower edge 40, the spaced notches 38 allowing a user of the device 10 to pre-tension the device to a force level which will necessitate the application of a predetermined "pull" in order to actuate the device.

The tension spring 14 comprises a coiled body portion 42 terminating at its upper end in a hook-like rounded segment 44 and at its lower end in a square hook-shaped segment 46 having a curved free end portion 47 facilitating manipulation of the lower end of the spring when engaging it with one of the notches 38. A loop 48 is formed in the spring 14 between the coiled body portion 42 and the square segment 46. The rounded segment 44 at the upper end 18 of the body member 12 is fitted through either one of spaced apertures 50 or 52 formed in the body member 12 at selected locations thereof, the body member 12 being received within the interior channel formed by the coiled body portion 42 of the spring 14. The body member 12 is thus movable relative to the spring 14, the spring 14 being attached at its upper end to the body member 12 by virtue of the lodgement of the rounded segment 44 of the spring in one of the apertures 50 or 52. Since the apertures 50 and 52 are spaced along the length of the upper end 18 of the body member 12, the spring 14 can be selectively tensioned to a desired force level depending on the aperture in which the segment 44 is inserted. Thus, as will be described in more detail hereinafter, the spring 14 can be set to provide a desired force level for setting a hook in the mouth of a fish.

Figure 5:
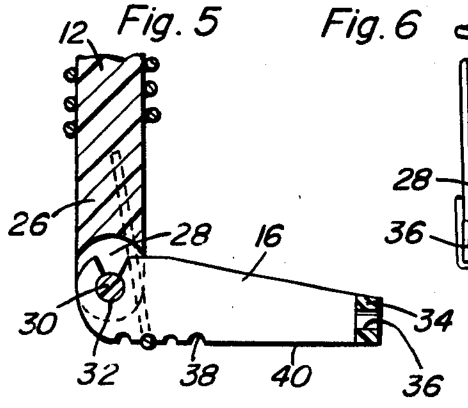
FIG. 5 is a detail elevational view in partial section of a portion of the device; and, FIG. 6 is a detail end view of a portion of the device.
Figure 6:
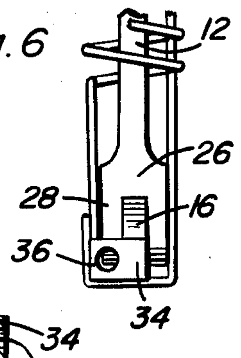

The square segment 46 at the lower end of the spring 14 is fitted into one of the notches 38 in the pivot arm 16, the pivot arm 16 being brought to a position wherein the longitudinal axis thereof is essentially perpendicular to the longitudinal axis of the body member 12 with the upper edge of arm 16 engaged with the curved bottom edge of yoke 26 as illustrated in FIG. 5. The spring 14 is thus extended and stores a selected level of potential energy depending on the selection of the aperture 50 or 52 and, to some degree, on the selection of the notch 38 in which the square segment 46 of the spring is caused to be located. A relatively short length 54 of fishing line is attached to the loop 48 of the spring 14 and is threaded along the pivot arm 16 and through the aperture 36 in the enlarged distal end 34 of said arm 16. The free end of the length 54 of fishing line has a fishhook 56 tied thereto in a known manner, the hook 56 being baited or having an artificial lure formed thereon. The length 54 of line is preferably attached to the loop 48 of the spring 14 prior to placement of the square segment 46 in one of the notches 38. The hook 56 should also be baited prior to putting the spring 14 under tension.

Figure 2:
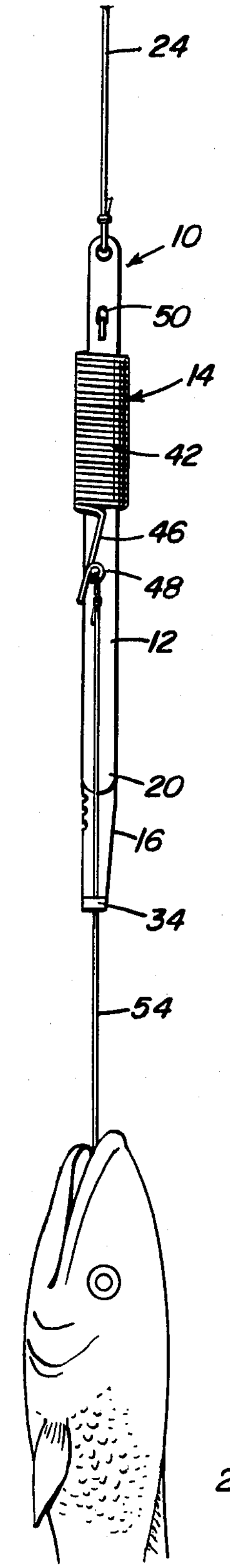
FIG. 2 is an elevational view of the invention after actuation thereof.

The hook setting device 10 is thus seen in FIG. 1 in an operative environment, the device being "cocked" and ready for a fish to strike the baited hook 56. When a fish, such as is seen in FIG. 2, capable of exerting a sufficient pull on the length 54 of line strikes the hook 56, the pivot arm 16 is caused to pivot about the pin 30 and to be pulled into an orientation wherein the longitudinal axis of the arm 16 and the body member 12 are essentially coincident. The square segment 46 of the spring 14 is thereby released from engagement with the notch 38, the spring 14 then contracting with substantial force to jerk the hook 56 in a direction along the length of the body member 12 toward the fishing line 24. Thus, the hook 56 is caused to be "set" in the mouth of the fish by virtue of the sudden, energetic action of the release of the spring 14 from the tensioned configuration assumed by said spring on cocking thereof. When the square segment 46 of the spring 14 is placed into one of the notches 38, the user can select a desired force level necessary to actuate the device 10. The further the distance from the pin 30 to a particular notch 38, the stronger must be the "pull" in order for the pivot arm 16 to be angularly displaced about the pin 30. The size and strength of the fish necessary to cause actuation of the device 10 is therefore determinable within general limits.

The device 10 is preferably formed of rust-resistant materials, the body member 12 and pivot arm 16 being conveniently formed of plastic, or like material, having substantial strength along the longitudinal axis thereof. The user of the present invention is provided with the ability to generally determine the size of the fish necessary to actuate the device, the force level with which the device acts to set the hook 56 being also selectable by ready adjustment of the fixed location on the body member 12 at which the upper end of the spring 14 is to be held.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for setting a hook on application of a sufficient force to said hook, the apparatus being attached to the end of a first length of line, the apparatus comprising:

an elongated body member having a first end and a second end, the first length of the line being attached generally at the first end of said body member;

a pivot arm pivotally mounted to said body member at the second end thereof and disposed to pivot about a pivot axis;

tension spring means mounted on said body member, the spring means being elastically deformable from a fixed point of attachment near the first end of the body member, a lower portion of the spring means being releasably engageable with the pivot arm when said spring means is in its deformed, tensioned state, the longitudinal axis of the pivot arm being held at an angle to the longitudinal axis of the body member by the pivot arm engaging the spring means at a position laterally spaced of the position of the pivot axis on the body;

a second length of line having one end thereof connected to said lower portion of said tension spring means and the opposite end connected to said hook;

engagement means slidably connecting said second length of line to said pivot arm at a position spaced from the pivot axis along the pivot arm such that a force exerted on said second line will produce a torque on said pivot arm causing the pivot arm to rotate toward the body second end thereby bringing the lower portion of the spring means into a position laterally spaced of the position of the pivot axis on the opposite side of the body from its initial position, thereby releasing the spring means from engagement with the pivot arm, the spring means returning toward its undeformed state to displace the hook substantially toward the body member.

2. The apparatus of claim 1 wherein the body member has a plurality of apertures disposed essentially near the first end thereof, the apertures comprising fixed points of attachment for the spring means to the body member, the apertures being spaced along at least a portion of the body member, selection of the aperture in which the spring means is attached to the body member allowing varying tensioning of the spring means when the lower portion of the spring means is engaged with in the pivot arm.

3. The apparatus of claim 1 and further comprising:

yoke means formed on the body member at the second end thereof, the yoke means having spaced parallel arms; and, pin means extending laterally between the arms of the yoke means to form said pivot axis, an inner end of the pivot arm being mounted for rotation on the pin means.

4. The apparatus of claim 3 wherein the pivot arm has an aperture formed in the inner end thereof, the aperture being open over a minor portion of its circumference, the aperture being fitted onto the pin means in a snap-fitting fashion.

5. The apparatus of claim 4 and further said engagement means comprises shoulder means formed on the pivot arm at a distal end thereof, the shoulder means having an aperture formed therein, the second length of line being threaded through said aperture from the point of attachment thereof with the spring means.

6. The apparatus of claim 1 wherein the spring means has a loop portion formed therein near the lower end thereof, the said one end of the second length of line being connected to said loop portion.

* * * * *